US012779798B2

(12) United States Patent
Harnois et al.

(10) Patent No.: US 12,779,798 B2

(45) Date of Patent: Nov. 3, 2026

(54) METHOD OF MANUFACTURING A MATERIAL COMPRISING AT LEAST ONE ELECTRONIC ELEMENT

(71) Applicants: UNIVERSITE DE RENNES, Rennes (FR); CENTRE NATIONAL DE LA RECHERCHE SCIENTIFIQUE—CNRS, Paris (FR); NANTES UNIVERSITÉ, Nantes (FR); CENTRALESUPELEC, Gif sur Yvette (FR); INSTITUT NATIONAL DES SCIENCES APPLIQUEES DE RENNES, Rennes Cédex (FR)

(72) Inventors: Maxime Harnois, Rennes (FR); Gaëtan Herry, Egly (FR); France Le Bihan, Cesson-Sevigne (FR); Jean-Charles Fustec, Plestin les Greves (FR)

(73) Assignees: UNIVERSITE DE RENNES, Rennes (FR); CENTRE NATIONAL DE LA RECHERCHE SCIENTIFIQUE—CNRS, Paris (FR); NANTES UNIVERSITÉ, Nantes (FR); CENTRALESUPELEC, Gif-sur-Yvette (FR); INSTITUT NATIONAL DES SCIENCES APPLIQUEES DE RENNES, Rennes (FR)

( * ) Notice: Subject to any disclaimer, the term of this patent is extended or adjusted under 35 U.S.C. 154(b) by 118 days.

(21) Appl. No.: 18/553,382

(22) PCT Filed: Mar. 31, 2022

(86) PCT No.: PCT/EP2022/058577

§ 371 (c)(1),
(2) Date: Sep. 29, 2023

(87) PCT Pub. No.: WO2022/207795

PCT Pub. Date: Oct. 6, 2022

(65) Prior Publication Data

US 2024/0181727 A1 Jun. 6, 2024

(30) Foreign Application Priority Data

Apr. 1, 2021 (EP) .................................... 21166779

(51) Int. Cl.

*B29C 70/86* (2006.01)
*B29C 70/54* (2006.01)
*B29L 31/34* (2006.01)

(52) U.S. Cl.

CPC ............ *B29C 70/86* (2013.01); *B29C 70/541* (2013.01); *B29L 2031/3493* (2013.01)

(58) Field of Classification Search

CPC ... B32B 37/0038; B29C 70/46; B29C 70/467; B29C 70/86; B29C 70/865; H10N 30/072
See application file for complete search history.

(56) References Cited

U.S. PATENT DOCUMENTS 9,270,016 B2 * 2/2016 Stoneback .............. B29C 70/30
9,480,163 B2 * 10/2016 Kessler .................. G08C 19/16
(Continued)

FOREIGN PATENT DOCUMENTS

EP 3650210 A1 5/2020

OTHER PUBLICATIONS

International Search Report issued on Jul. 15, 2022, in corresponding PCT Patent Application No. PCT/EP2022/058577, 3 pages.

*Primary Examiner* — Philip C Tucker
*Assistant Examiner* — Hana C Page
(74) *Attorney, Agent, or Firm* — Maier & Maier, PLLC

(57) ABSTRACT

A method of manufacturing a composite material including at least one ply integrating at least one electronic element situated at the surface of the ply. Also, materials obtained
(Continued)

thereof and devices including such materials. The method includes: a) preparing or providing a first substrate having at least one layer; b) applying at least one electronic element onto a face of the first substrate; c) at least partially impregnating the so-obtained product within an impregnation material to form a matrix incorporating the at least one electronic element and the first substrate; d) preparing or providing an impregnable second substrate, the second substrate being placed on top of the impregnated at least one electronic element so that the at least one electronic element is interposed between the first substrate and the second substrate; e) removing the first substrate from the impregnated product obtained; and f) recovering the composite material.

10 Claims, 7 Drawing Sheets

(56) References Cited

U.S. PATENT DOCUMENTS

| | | | | |
|---|---|---|---|---|
| 12,064,927 | B2 * | 8/2024 | Fay | B29C 70/305 |
| 2014/0097011 | A1 * | 4/2014 | Hofer | H05K 1/038 174/261 |
| 2016/0343467 | A1 * | 11/2016 | Wen | H01B 7/0823 |
| 2021/0308961 | A1 * | 10/2021 | Zhao | H05K 3/4664 |

* cited by examiner

METHOD OF MANUFACTURING A MATERIAL COMPRISING AT LEAST ONE ELECTRONIC ELEMENT

FIELD

The present invention relates to a method of manufacturing a composite material comprising at least one ply integrating at least one electronic element situated at the surface of said ply, a device comprising such composite material and a composite material comprising such ply.

BACKGROUND

Research directed towards integrating electronic functions within commonly used objects has been an ongoing objective for years. In this context, composite materials gained interest for the past years.

A composite material is defined as a combination of at least two materials of different nature which, when put together in a single entity, they show superior features to the features shown by each of the constituting materials alone. Nowadays, there is a visible tendency of transforming composite materials into intelligent materials. For example, this may be done by adding electronic functions in objects in order to manufacture the so-called "Smart composites".

Therefore, along with the primary function of the composite material (mechanical, aesthetic, etc.), such intelligent material may even interact with its environment via a human/machine interface, via sensors, via antennas, via displays etc.

Composite materials should show enough resistance so as to withstand the environment in which they are placed while protecting the electronic elements they house.

EP2546924 relates to a method and apparatus comprising a resin layer, conductive elements and layers of reinforcement material. The conductive elements are situated on the resin layer. The conductive elements form an antenna system. The layers of reinforcement material form a reinforcement for the composite structure and at least a portion of the resin layer forms a matrix for said composite structure. The resin layer plays the role of a substrate. Accordingly, the composite structure is a multi-layered composite structure. The layers of composite structure comprise the above-cited reinforcement and the above-cited matrix. The matrix is configured to surround the reinforcement to provide support thereto.

However, depending on the end-use of the composite structure, it is important to adapt its shape. For instance, in order to increase the flexibility of composite structures comprising electronic elements, flexible substrates may be employed.

US2017/0356883 relates to a measuring system for determining damage to components including at least one fibre-reinforced plastics material, comprising mutually spaced sensors. The sensors are distributed over a flexible substrate connected to the component via a matrix component in the use position.

US2015/083473 relates to a flexible electronic substrate system in the form of a composite material comprising at least one conductive layer and at least one laminate layer bonded to said conductive layer. Said laminate layer comprises at least one unidirectional adhesive tape layer coated with monofilaments arranged in a predetermined direction within said tape. The layers are preferably combined and cured together using pressure and temperature. The unidirectional layers form thin and smooth substrates that are suitable for etching or printing of electronic circuitry.

Bekas et al (Bekas, Dimitrios & Sharif Khodaei, Zahra & Aliabadi, M. H. (2018). An Innovative Diagnostic Film for Structural Health Monitoring of Metallic and Composite Structures. Sensors. 18. 10.3390/s18072084) relates to a flexible diagnostic film comprising sensors and a multiple-path wiring using inkjet printing. Such film can be attached to the surface of a structure or embedded within the composite layup during curing. A SMART Layer is used. The layer is fabricated by etching a conductor patten onto a dielectric substrate, laminating a cover layer for electrical insulation and mounting an array of PZT transducers on the circuit. It is either bonded to a metallic surface using secondary bonding with epoxy or, in the case of composite structures, the layer is embedded into the structure during the manufacturing process. The surface-mounted film can simply be peeled off in order to reach the transducers for repair.

US2009189307 relates to flexible films incorporating active and interactive devices, said films being integrally moulded with a plurality of plies into a composite structure wherein said film is situated at the outermost extremity of the composite structure. The plies preferably the plies comprise graphite fibres dispersed in a mouldable resin matrix. The end composite structure is formed by placing a film and a plurality of plies as described above between two mould parts, heating the two mould parts to an elevated temperature and pressed toward one another at a reduced pressure for a period of time necessary to form, cure and integrate the plies and film. Thus, peeling is mitigated.

Composite materials are widely spread in the industry (building, aeronautics or automotive industry) since they offer an excellent compromise between weight and mechanical resistance. However, their mechanical properties are conditioned by mastering their manufacturing processes and/or the environment wherein they will be implemented (UV, ionic rays, humidity, temperature, corrosion, physical loadings etc.). For instance, a defect during the manufacturing process may well involve a defect in the end-product or mechanical brittleness. Studying emerging defects, such as layer delamination, peeling, cracks, fibre or matrix fractures, remains a challenge and it is thus appropriate to detect and to quantify their appearance.

For instance, if a composite material integrates a function of strain sensor, it could monitor while operating whether the undergoing mechanical strains do not exceed a reference value leading to its damage (ex. delamination), or even its complete destruction via fracture. This is usually known as "Structural Health Monitoring". It consists in placing a sensor at the surface or within the structure of the composite material.

A known solution under study nowadays is the insertion of optical fibre as a strain sensor between plies of a composite material. However, the process of manufacturing leads to defects within the structure of the material such as resin protuberances, or even voids. Such defects appear when the optical fibre is not positioned following the same orientation as the composite fibres. They are illustrated in FIGS. 1*a*-1*d* obtained via Scanning Electron Microscope. FIG. 1*a* shows carbon fibres within a matrix. FIGS. 1*b*-1*c* show a detailed view of an optical fibre oriented in the same direction as the carbon fibres at 0° and 90° in FIGS. 1*b* and 1*c*, respectively. These defects may act like primers enabling delamination. This problem partially arises because the dimension of the optical fibre (about 100 μm) is highly superior to those of carbon fibres making up the composite material (about several μm). The same problem arises when metallic strain gauges manufactured on a flexible substrate are inserted in a composite material. FIGS. 1*d* and 1*e* illustrate the problems encountered with this configuration. FIG. 1*d* shows metallic sensor gauges on a plastic substrate seen from above, while FIG. 1*e* shows a cross-section of such a gauge. Thus, both of these figures according to the prior art show the flexible substrate incorporated between the plies of a composite material. Its presence provides extra thickness which untimely leads to the delamination of the composite material. These figures are part of the thesis of Dr. Demirel "Contribution à l'optimisation des mesures de température et de déformation par capteur à fibre optique à réseau de Bragg: application au procé dé de fabrication des composites par infusion de résine"—"Contribution to the optimization of temperature and deformation measurements using a Bragg network optical fiber sensor: application to the manufacturing process of composites by resin infusion".

However, adding so-called "intelligent functions" to a composite material should not have a negative influence on the primary function of said material. Current solutions are the state of the art indicate adding various sensors or electronic devices in spite being too intrusive and thus negatively influencing the structural quality of the composite materials.

Touloup et al. (Corentin Tuloup, Walid Harizi, Zoheir Aboura, Yann Meyer, Kamel Khellil, et al. On the manufacturing, integration, and wiring techniques of in situ piezoelectric devices for the manufacturing and structural health monitoring of polymer-matrix composites: A literature review. Journal of Intelligent Material Systems and Structures, SAGE Publications, 2019, pp. 1045389X1986178) provides a general review of what has been achieved on the manufacturing, embedding and wiring techniques of various kinds of piezoelectric devices for manufacturing monitoring and structural health monitoring applications of polymer-matrix composites. According to this article, polymer-matrix composites allow building structures considerably lighter than usual metallic ones without degrading too much their mechanical properties. Chapter 4.1.1.2. of this article particularly relates to embedding techniques of piezopolymers films inside composite structures. Embedding may be carried out, for instance, by adding sensors between the plies of glass fiber mat/thermoset resin host laminates (Mills), by embedding sensors using resin transfer molding process (Schulze et al), by embedding piezopolymer films inside composite stacks made of prepreg S-Glass/epoxy at various depths and positions (Wenger et al., Bae et al., Blanas and Das-Gupta) and then curing said stacks (Wenger et al).

The bibliographical references are cited herein:

Schulze et al—Schulze R, Streit P, Fischer T, et al. Fiber-reinforced composite structures with embedded piezoelectric sensors. IEEE Sensors. 2014; 2014:6-9.

Wenger et al.—Wenger, M. P., P. Blanas, R. Shuford and D. Das-gupta. "Characterization and evaluation of piezoelectric composite bimorphs for in-situ acoustic emission sensors." Polymer Engineering and Science 39 (1999): 508-518.

Bae et al—Bae, Ji-Hun & Lee, Sung-Woo & Chang, Seung-Hwan. (2017). Characterization of low-velocity impact-induced damages in carbon/epoxy composite laminates using a poly(vinylidene fluoride-trifluoroethylene) film sensor. Composites Part B: Engineering. 135. 10.1016/j.compositesb.2017.10.008.

Mills, J. A. (2013). Using embedded polyvinylidene film sensors and metal foil strain gages to monitor the resin curing process in thick fiberglass-resin composite laminates.

Blanas and Das-Gupta:

P. Blanas and D. K. Das-Gupta, "Composite piezoelectric sensors for smart composite structures," 10th International Symposium on Electrets (ISE 10). Proceedings (Cat. No. 99 CH36256), Athens, Greece, 1999, pp. 731-734, doi: 10.1109/ISE.1999.832148.

Blanas, P., & Das-Gupta, K. (1999). Composite Piezoelectric Materials for Health Monitoring of Composite Structures. MRS Proceedings, 604, p 45-50. doi: 10.1557/PROC-604-45, available at https://www.cambridge.org/core/journals/mrs-online-proceedings-library-archive/article/abs/composite-piezoelectric-materials-for-health-monitoring-of-composite-structures/875D6FF38498428BF4C4247466A8B40C.

Meyer et al. (Meyer, Y., Lachat, R., & Akhras, G. (2019). A review of manufacturing techniques of smart composite structures with embedded bulk piezoelectric transducers. Smart Materials and Structures, 28, 053001) also provides a review of manufacturing of smart composites structures with embedded bulk piezoelectric transducers. Furthermore, the authors outline the main shortcomings of composite materials. Some examples are: weakness to delamination or ply separations, impact of temperature and moisture on their mechanical performance, difficulty in refurbishing them and mechanically connected them to their environments and high costs. According to the authors, an ongoing challenge since the onset of smart structures is the way of embedding smart material during the manufacturing process. "The important of embedding techniques is related to the way of including the bulk piezoelectric transducers inside the composite structure. These techniques are very critical in placing the transducer along the thickness-axis and into the composite structure. The easiest method is to directly place the transducer between two plies. For this, the transducer thickness has to be thin with respect to typical ply thickness. With this technique, the continuity of different plies is guaranteed. Resin pockets appearing at the transducer boundaries [ . . . ] can create a structural weakness leading, for instance, to an initiation of delamination. Moreover, if the transducer location is not accurately defined, the piezoelectric element can move during the compaction and the resin will spread. Therefore, it is necessary to glue the transducer on a ply with a glue compatible with the resin. Another method is to use a ply with cut-out. The cut-out has to have the exact geometry of the transducer. [ . . . ] However, some discontinuities may be generated in the fibre layer. Moreover, for complex structures, the geometry of the cut-out and the accurate positioning of the transducer can be difficult to achieve. [ . . . ] Therefore, the transducers are not anymore directly included during the manufacturing process, they are contained within two insulated layers. After impregnation, a semi-finished product is created [ . . . ] and embedded between two fibre layers. Moreover, the resin of the semi-finished product has to be compatible with the one of the final composite structure." "With the semi-finished products, it is also possible to accurately guarantee that the final positioning of the transducer [ . . . ] will be achieved". Accordingly, semi-finished products have been developed using polyimide encapsulation (Kapton or SMART Layer).

US2006154398 relates to a method of manufacturing a diagnostic layer containing an array of sensing elements. The sensing elements, associated wires, and any accompanying circuit elements are incorporated as various layers of a thin, flexible substrate. The flexible substrate has a dielectric layer and conductive leads exposed on the dielectric layer, the conductive leads extending to an edge of the dielectric layer. Also provided is a first flexible nonconductive cover layer having holes therethrough. The first cover layer is affixed to the flexible substrate so as to overlay the conductive leads. This first cover layer is overlain in such a manner as to align the holes with the conductive leads, thereby exposing at least a portion of the conductive leads through the first cover layer. Sensing elements are then placed through the holes in the first cover layer and onto the conductive leads, and an adhesive is deposited within the holes so as to surround the sensing elements with the adhesive. This substrate can then be affixed to a structure so that the array of sensing elements can analyse the structure in accordance with structural health monitoring techniques. The substrate can also be designed to be incorporated into the body of the structure itself, such as in the case of composite structures.

There is thus a need to provide composite materials integrating electronic elements so that the integrated elements are less intrusive towards the composite materials, or their influence is even negligible, while not bringing any damage to the primary function of said materials.

Thus, a purpose of the present invention to provide a manufacturing process of such composite materials wherein the defects in the end-product are minimized. There is a further purpose to provide such manufacturing process which may easily be used and adapted in existing manufacturing facilities. A further purpose of the invention is to provide a versatile manufacturing process that may be implemented on a wide variety of composite materials and electronic components.

Another purpose of the present invention is to provide composite materials integrating electronic elements, preferably obtained via such manufacturing processes, that may be easily integrated into a device and which may easily communicate with the environment wherein such said materials are installed.

An object of the present invention is thus to provide a process of manufacturing a composite material comprising a plurality of plies wherein at least one electronic element is added in the least intrusive possible manner so that the primary function of the material is not damaged (structural quality, mechanical functions, aesthetical functions).

SUMMARY

According to a first aspect, the invention relates to a method of manufacturing a composite material comprising at least one ply integrating at least one electronic element situated at the surface of said ply, the method comprising the following steps:

a) preparing or providing a first substrate T comprising at least one layer;
b) applying at least one electronic element onto a face of the said first substrate;
c) preparing or providing an impregnable second substrate P, said second substrate P being placed on top of the said at least one electronic element so that the at least one electronic element is interposed between the first substrate T and the second substrate P;
d) impregnating the so-obtained product within an impregnation material to form a matrix incorporating the at least one electronic element and the second substrate P;
e) removing the first substrate T from the impregnated product obtained in step d);
f) recovering the composite material.

According to a second aspect, the invention relates to a device comprising a composite material obtained according to the first aspect.

According to a third aspect, the invention relates to a composite material comprising at least one ply integrating at least one electronic element situated at the surface of said ply, said composite material further comprises electrical connections means fixed to the at least one electronic element and configured to traverse the thickness of each ply constituting the composite material according to a direction generally perpendicular to the plane of the said plies.

BRIEF DESCRIPTION OF THE DRAWINGS

Like reference numerals refer to corresponding parts throughout the drawings. Also, it is to be understood that the depictions in the figures are diagrammatic and not to scale.

DETAILED DESCRIPTION

Figure 1A:
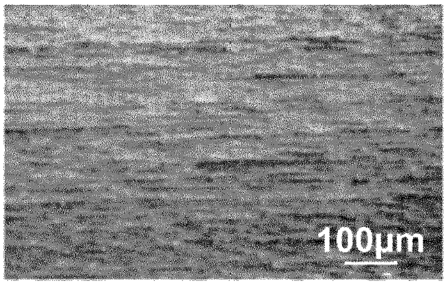
FIGS. 1*a-e* show the surface of composite materials according to prior art wherein 1*a* obtained via Scanning Electron Microscope shows carbon fibres within a matrix; 1*b*-1*d* obtained via Scanning Electron Microscope show a detailed view of an optical fibre oriented in the same direction as the carbon fibres at 0° and 90° in FIGS. 1*b* and 1*c*, respectively; 1*d* shows metallic sensor gauges on a plastic substrate seen from above, while 1*e* shows a cross-section of such a gauge.
Figure 1B:
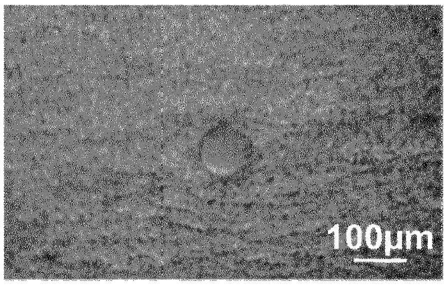
Figure 1C:
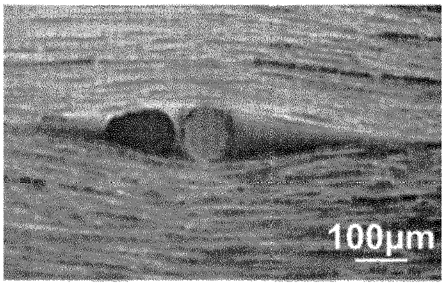
Figure 1D:
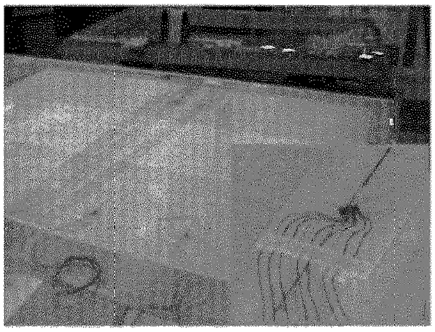
Figure 1E:
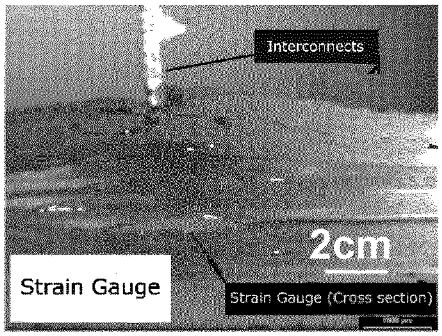

According to a first aspect, the invention relates to a method of manufacturing a composite material comprising at least one ply integrating at least one electronic element situated at the surface of said ply, the method comprising the following steps:

a) preparing or providing a first substrate T comprising at least one layer;
b) applying at least one electronic element onto a face of the said first substrate;
c) at least partially impregnating the so-obtained product within an impregnation material to form a matrix incorporating the at least one electronic element and the second substrate P;
d) preparing or providing an impregnable second substrate P, said second substrate P being placed on top of the impregnated at least one electronic element so that the at least one electronic element is interposed between the first substrate T and the second substrate P;
e) removing the first substrate T from the impregnated product obtained in step d);
f) recovering the composite material.

A composite material is defined as a combination of at least two materials of different nature.

According to the invention, throughout the specification, an impregnable second substrate P designates a second substrate P.

Accordingly, the at least one electronic component is present at the surface of the ply. Its integration is not intrusive, thus still ensuring the primary functions of the composite material along with its electronic function.

This process is further advantageous since it can be implemented in existing manufacturing facilities, thus minimising the costs in investments.

Furthermore, according to this process, it is possible to use a high array of materials, opening whole the way to new perspectives and new possible applications. This advantage is further enhanced by the fact that the process provides composite materials comprising a single ply integrating at least an electronic element. The so-obtained single functionalized ply composite material allows a versatile use, depending on the envisaged application. This is fundamentally different from composite layers of the prior art wherein an electronic element had to be integrated between at least two plies.

The electronic elements may be chosen from interconnections, antennas, EMC shielding, sensors, such as strain gauges, chemical sensors, biochemical sensors, physical sensors to detect various parameters such as temperature, pressure, strain etc.

The electronic elements may be applied using different techniques. The electronic elements may be applied by evaporation (metals, polymers, semi-conductors, etc), in solution by screen printing, inkjet, roll to roll, etc.

The first substrate T comprises at least one layer. The skilled person will adapt the type of substrate used according to the parameters imposed for applying the electronic element. For instance, if the electronic element needs to be applied according to a method working only within a certain temperature range, the first substrate T needs to be adapted accordingly, while still being easy to remove according to step e) of the process with common techniques. As a result, the first substrate T may be a single-layer substrate or a multi-layer substrate. Alternatively, or complimentarily, said substrate may be made of specific materials that withstand the required operating conditions. For instance, If the electronic element consists of patterns requiring the use of a photolithography step or of materials produced at temperatures above 100° C., the first substrate T may be a multi-layer substrate wherein each layer is compatible with its intended use.

The said second substrate P may present a thickness comprised between 50 and 300 μm, preferably between 50 and 200 μm.

A single-ply composite material manufactured according to this method may present a thickness comprised between 100 μm and 500 μm, preferably between 200-400 μm, even more preferably between 250-350 μm, and even more preferably between 250-300 μm.

According to this method, it is possible to manufacture both single-ply composite materials and multi-ply composite materials. Thus, a composite material comprising at least two plies and integrating each at least one electronic element is obtained by assembling each additional ply in a direction perpendicular to the plane of the plies.

According to an embodiment, the thickness of the second substrate P is superior to the thickness of the electronic element. This ensures a better integration of the electronic elements within the end composite material. Herein, "the thickness of the electronic element", is to be understood as the distance between the upper most point of the various electronic elements if they are arranged one on top of the other starting from the second substrate P and said substrate P.

Preferably, the ratio between the thickness of the single-ply composite material and the thickness of the electronic element is at least 300, preferably at least 500, more preferably at least 700, even more preferably at least 1000.

According to an embodiment, the first substrate T is removed by dissolving, stripping, peeling or etching or a combination thereof. A detailed overview is given below.

In case the first substrate T is removed by dissolving, the substrate should be flexible, have a low adherence to polymers in general and/or be easy to solubilize in common solvents. Examples thereof are first substrates T made of polyvinyl alcohol (PVA) which is soluble in water or in any other water-soluble compound or made of PMMA soluble in acetone.

The first substrate T may be a commercial PVA sheet, such as Design Plus Hydrograhpics PXA4. Alternatively, the first substrate T may be a PVA sheet obtained by laminating, spin-coating, bar coating using PVA powders. Preferably, the molecular weight of such powders is comprised between 10 000-100 000 g/mol, preferably between 20 000-80 000 g/mol, even more preferably between 30 000-70 000 g/mol.

According to an embodiment, the second substrate P is a porous material. It thus allows the impregnation material to infuse the second substrate P and pass through it to reach the at least one electronic element placed on the first substrate T.

Suitable porous materials may be chosen from a woven fibre substrate such as fiberglass, carbon fibres, flax fibres, Kevlar fibres. These fibres are advantageous since they offer lightness to the composite material. Other suitable materials may be made of polyester or polyurethane. Vegetal fibres, or cellulose-base fibres, may also be used and they need to be compatible with the impregnable material used. The skilled person would adapt the material according to his/her needs. For instance, in case the composite material comprises a woven fibre substrate that can be used in textiles, such substrate is to be chosen so that it is compatible with the impregnable material.

Step c) of impregnation can be performed after the placement of the second substrate according to step d) directly onto the at least one electronic element and at least one part of the face of the said first substrate onto which said electronic element is applied. Thus, the order of the steps may be interchanged. Due to the porous nature of the second substrate P, the impregnation step may be performed by smearing the impregnation material directly onto the said element and first substrate. Then the second substrate P may be added so that the impregnable material and the at least one electronic element are sandwiched between the two substrates.

Independently on the order of steps c) and d), the impregnation step may be performed by a technique readily chosen by the skilled person according to his/her needs. For example, the impregnation step is performed by smearing, contact moulding, injection moulding, vacuum moulding, vacuum infusion moulding, resin transfer moulding (RTM), vacuum-assisted resin transfer moulding (VARTM), resin film infusion (RFI).

Alternatively, the second substrate P is a pre-preg. Commercial pre-pregs are sold under the name of Prepeg Verre-Époxy VTC401-G50-STYLE 1080-50% RW by Castro composites or PREG M77/38%/395P/G-1250 mm (ref: HEXLM77/38/395P) by SF composites).

According to an embodiment, the impregnation material is a curable resin. It may be chosen from an epoxy resin or a polyester. Advantageously, a curable resin brings rigidity to the composite material.

The curable resin should have a viscosity suitable for fully impregnating the second substrate P.

According to an embodiment, the curable resin may have a viscosity comprised between 500 and 3000 mPa·s measured at 20° ° C., preferably between 800 to 2000 mPa·s measured at 20° C.

According to a preferred embodiment, the second substrate P is made of woven fiberglass and the impregnation material is an epoxy resin. This leads to a composite material that is light and rigid at the same time. The skilled person would know to adapt the materials used for the second substrate P and the impregnation material showing the same features.

Resins that may be used are sold under the commercial name of SR InfuGreen 810 by Sicomin Epoxy Systems or Resoltech 1050 Résine Époxy d'infusion by Castro Composite or RESINE EPOXY 1050 (ref: AXS02L1050/1) by SF Composite.

Preferably an additive such as a hardener may be further added to the resin. Hardeners that may be used are sold under the commercial name of SD 8824 or DUR EPOXY 1058 pour résine epoxy 1050 (reference: AXS02S1058/0.35) by SF Composite.

The skilled person will adapt the ratios used between the resin and the hardener if such hardener is used. For example, the two compounds may be used in a mass ratio resin: hardener comprised between 15:85 to 30:70.

According to an embodiment, the hardener may have a viscosity comprised between 1 and 15 mPa·s measured at 20° C., preferably between 3 to 9 mPa·s measured at 20° C.

According to an embodiment, the hardener may have density between 0.9200 and 0.9600 measured at 20° ° C., preferably between 0.9300 and 0.9500 measured at 20° C.

According to an embodiment, the composite material comprises at least two electronic elements integrated within the same ply, said elements either being placed onto the same face of the first substrate T mutually spaced from one another or being placed one on top of the other starting from the same face of the first substrate T in a sandwich-like manner. The freedom to choose the number of electronic elements integrated within the same ply as well as their position increases the versatility of the process and the number of possible end-applications.

According to an embodiment, the composite material comprising at least two contiguous plies assembled in a direction perpendicular to the plane of the plies and integrating each at least one electronic element.

According to an embodiment, the composite material comprising at least two plies assembled in a direction perpendicular to the plane of the plies and integrating each at least one electronic element, preferably said composite material further comprises at least one second substrate P interposed between said at least two plies.

Preferably, the second substrate P is a ply exempt from integrated electronic elements situated at its surface.

Thus, the said at least two plies integrating each at least one electronic element may either be contiguous or separated by at least one additional ply which may be the same of different from the second substrate P. Preferably the at least one additional ply is the same as the second substrate P.

According to an embodiment, a subsequent step is performed after the second substrate P is placed and after the impregnation material is applied according to steps b) and c), said subsequent step consists in covering substantially completely the outer face of the second substrate P with at least an element suitable to confer the definitive form of the composite material. This allows a better impregnation of the impregnable material into the second substrate P while ensuring that the thickness of the resin and of the impregnated second substrate P is constant throughout the composite material. Furthermore, it also ensures the repeatability of the manufacturing process.

According to an embodiment, the composite material recovered in step f) is placed on a mould so that the shape of the said composite material conforms to the shape of the mould. It is therefore possible to obtain 3D composite materials.

According to an embodiment, the first substrate T is placed on a mould prior to step b) so that the shape of the said first substrate T conforms to the shape of the mould. Preferably the mould is a temporary mould that will be removed once the ply integrating at least an electronic element and/or the composite material is/are obtained. The skilled person will readily choose the shape of the mould and, in particular the side of the mould coming into contact with the first substrate T according to his/her needs. For example, said side may be convex.

According to an embodiment, the composite material recovered in step f) is placed on a mould so that the shape of the said composite material conforms to the shape of the mould.

At least an additional ply either integrating at least an electronic component or being exempt from it may be further added on top of the composite material in order to obtain a multi-ply composite material.

Alternatively, each ply constituting the composite material is positioned directly on the mould, one on top of the other on the mould if the composite material is multi-ply, before being impregnated.

According to an embodiment, electrical connection means are fixed to the at least one electronic element and extend outwardly therefrom according to a direction parallel to the plane of the said ply. The at least one electronic element may thus communicate through electrical means with the outer environment. If at least two electronic elements are integrated within the same ply, further electrical connection means may be provided in order to link them with one another.

According to an embodiment, electrical connections means are fixed to the at least one electronic element and are configured to traverse each ply and second substrate P constituting the composite material according to a direction generally perpendicular to the plane of the said plies. This is particularly advantageous since it allows to connect the at least one electronic component within the composite material along different direction, thus increasing the number of directions that said composite material be implemented in its environment.

According to a second aspect, the invention relates to a device comprising a composite material obtained according to the first aspect.

The device may be chosen from a printed circuit board, an electronic sensor, an electronic card, a strain gauge.

Such device may be incorporated in a wide variety of objects, such as clothing (e.g. intelligent garments, technical garments, coated textiles), pieces of furniture, electronics, automobile components, airplane components, building materials, household appliances. It may thus be incorporated in any object as a composite material providing an electronic functionality.

According to a second aspect, the invention relates to a device composite material comprising at least one ply integrating at least one electronic element situated at the surface of said ply, said composite material further comprises electrical connections means fixed to the at least one electronic element and configured to traverse the thickness of each ply constituting the composite material according to a direction generally perpendicular to the plane of the said plies.

According to an alternative or complementary embodiment, said device further comprises electrical connections means fixed to the at least one electronic element and configured to extend outwardly therefrom according to a direction parallel to the plane of the said ply.

Thus, the at least one electronic element may communicate with the environment wherein the composite material is implemented following various directions.

When the composite material comprises at least two plies assembled in a direction perpendicular to the plane of the plies, at least one ply integrates at least one electronic element situated at its surface, wherein each of the electronic elements are electrically connected by said electrical connection means traversing the thickness of each ply.

Preferably, the ply is at least partially made of a porous material. Event more preferably, the size of the pores is larger than the cross-section of the electrical connections means so that said means may traverse said porous material.

Furthermore, when each ply assembled in a direction perpendicular to the plane of the plies may integrate at least one electronic element, said elements are configured so be connected to that the same electrical connection means traversing the thickness of each ply This is particularly advantageous since the number of electrical connection means needed is diminished.

Preferably, the electrical connection means can be screen printed up to the edges of the second substrate. Even more preferably, said connection means are also printed directly to the electrical element making up the composite material.

FIGS. 2-6 illustrate a composite material according to the first embodiment.

Figure 2:
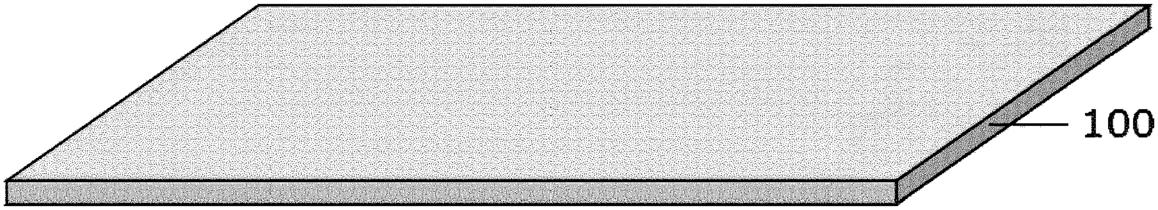
FIG. 2 is a perspective view, diagrammatically illustrating the first substrate T 100 according to a first embodiment of the present invention.

FIG. 2 illustrates a first substrate T 100 is provided. It is a PVA sheet. It may either be a commercial sheet or one that is obtained by coating in a laboratory.

Figure 3:
FIG. 3 is a perspective view, diagrammatically illustrating the first substrate T 100 according to a first embodiment of the present invention according to FIG. 2 further comprising an electronic element 200.

FIG. 3 illustrates a first substrate T 100 containing an electronic element 200. The electronic element 200 has been deposited on one side of the first substrate T100.

Figure 4:
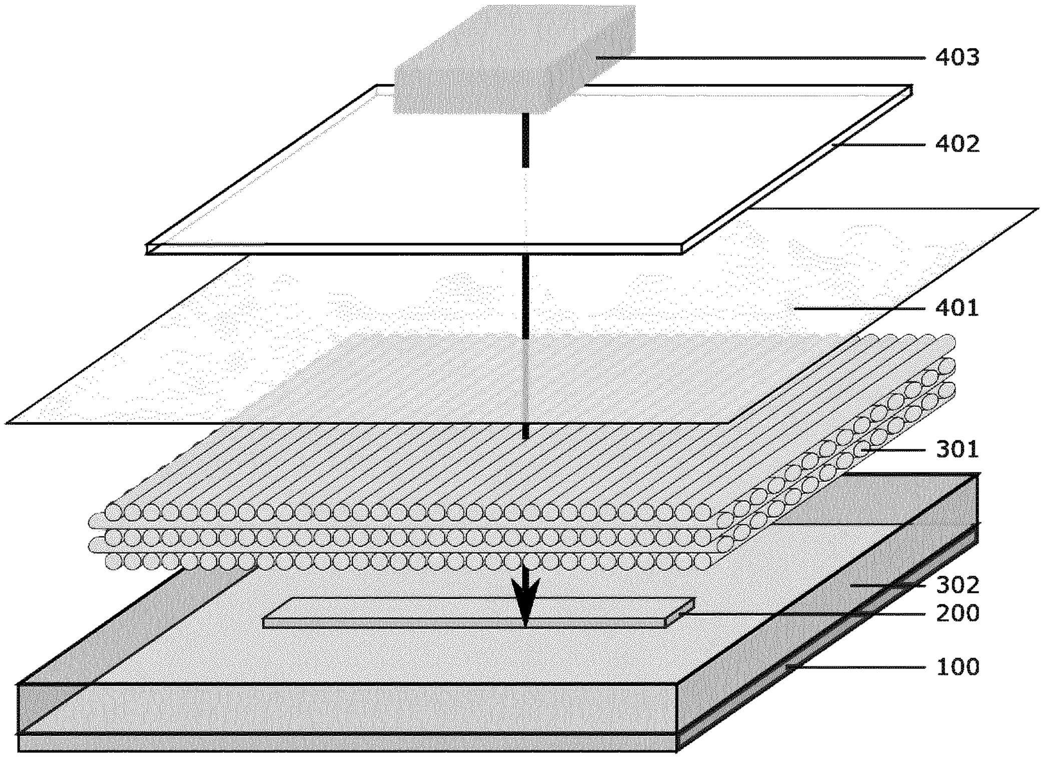
FIG. 4 is an exploded view, diagrammatically illustrating the first substrate T 100 and an electronic element 200 according to a first embodiment of the present invention according to FIG. 2 further illustrating the second substrate P 301 and a series of elements (401, 402, 403) suitable to confer the definitive form of the composite material.

FIG. 4 further illustrates an intermediate step of the process of manufacturing the composite material wherein the first substrate T 100 and its electronic function 200 is coated with an epoxy resin 302 Once the coating has been performed, the second substrate P 301 in the form of a layer of fiberglass is deposited onto the coated entity. To allow good impregnation of the resin 302 in the fiberglass 301 and obtain an impregnated second substrate 300 with a constant thickness upon each process, a silicone tarpaulin 401 (or any type of low-adhesion film) with a glass plate 402 and a weight 403 are superimposed on the surface of the impregnated fiberglass 300. Alternatively, the second substrate P 301 is deposited onto the first substrate T 100 and its function 200 prior to the coating step with the epoxy resin 302.

Figure 5A:
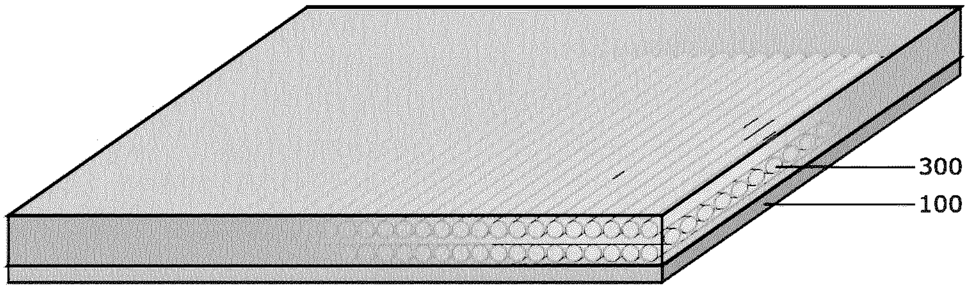
FIGS. 5*a* and 5*b* are perspective views, diagrammatically illustrating on both sides the impregnated second substrate P 300 associated to the first substrate T 100 before removal of the latter.
Figure 5B:
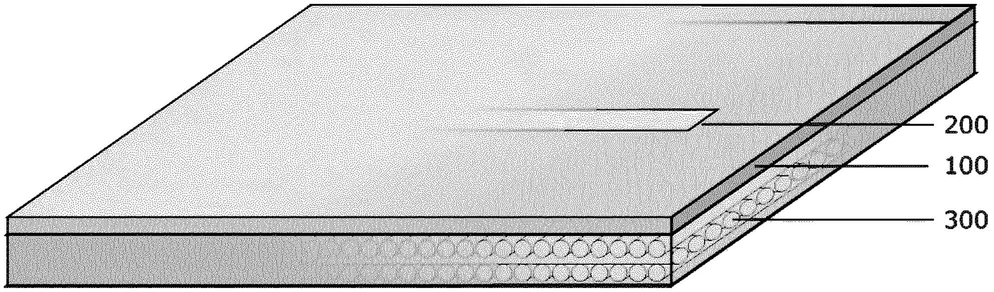

Once the resin has hardened, the weight 403, the glass plate 402 and the silicone cover 401 used for the impregnation are manually removed. The resulting product is illustrated in FIGS. 5*a* and 5*b*. The electronic element 200 is integrated in the hardened resin, at the interface with the first substrate T 100.

FIG. 5*b* is in fact FIG. 5*a* turned upside down. For illustrative purposes only, layer 100 is semi-transparent so that the electronic element 200 can be seen. This same electronic element is integrated into the substrate 300 at the surface thereof. The first substrate T 100 (named temporary) can then be removed either by mechanical means or else dissolution (in water if the substrate is water-soluble).

Figure 6:
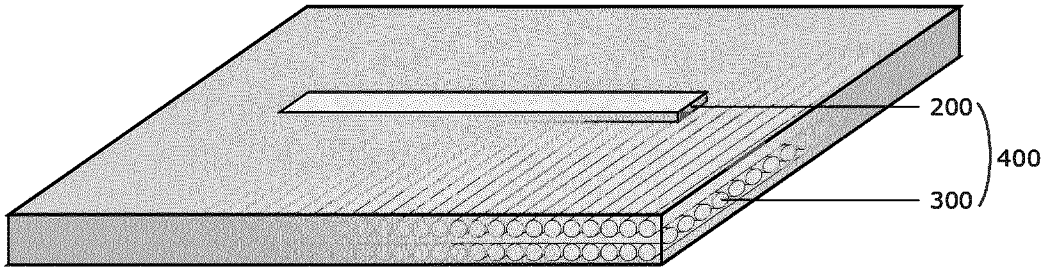
FIG. 6 is a perspective view, diagrammatically illustrating the functionalized ply 400 obtained according to the first embodiment of the present invention.

FIG. 6 illustrates the final composite material comprising a single ply integrating an electronic component at its surface. It is thus a single functionalized ply. The electronic element is integrated therein but it is accessible at the surface. The first substrate T was removed. The skilled person will readily choose the removal method that is the most appropriate. For instance, one option is to mechanically remove said substrate by tearing it off because its adhesion to the composite material is weak and the electronic element shows a higher degree of adhesion to the composite material than to it. Another option is to dissolve said substrate in an appropriate solvent. In case a PVA first substrate is used, the solvent may be water because PVA is water soluble.

Once a single ply integrating an electronic component at its surface is obtained, it can further be integrated within a planar or 3D composite material. An intelligent composite part may consist of stacking at least two plies, one of which is functionalized, as illustrated in FIGS. 14*a-d*.

As defined herein, a functionalized ply refers to a ply integrating at least an electronic element at its surface.

It is noted that the electronic element is very thin, its thickness may vary between 100 and 500 nm. Thus, the orders of magnitude on the schematic representation are therefore impossible to represent.

FIGS. 7-12 illustrate a composite material comprising a single ply integrating an electronic component at its surface according to the second embodiment. It is thus a single functionalized ply.

According to this embodiment, the electronic element consists of patterns requiring the use of materials produced at temperatures above 100° C.

As a result, the method of manufacturing according to the present invention allows to obtain composite materials independently of whether high temperatures are needed or not for use of specific materials.

Figure 7:
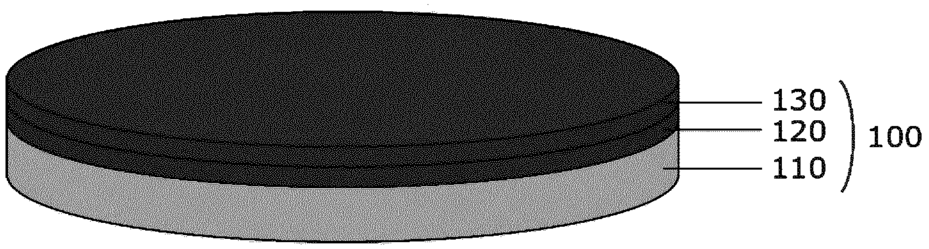
FIG. 7 is a perspective view, diagrammatically illustrating the first substrate T 100 according to a second embodiment of the present invention.

FIG. 7 illustrates a three-layer first substrate T 100 comprising a first outer layer 110, a second middle layer 120 and a third inner layer 130. Said first outer layer 110 may be any type of wafer used in microelectronics or plates of glass, quartz or other plates compatible with coating by centrifugation. For example, it may be a silicon wafer.

Said second middle layer 120 is non-adhesive layer (120). It should be easily soluble (with a solvent, for example) and/or have poor adhesion with the third inner layer (130). Said third inner layer is the one coming into contact with the electronic element and should be a material compatible with the chemicals and the maximum temperature involved when applying the electronic element on the first substrate T.

Figure 8:
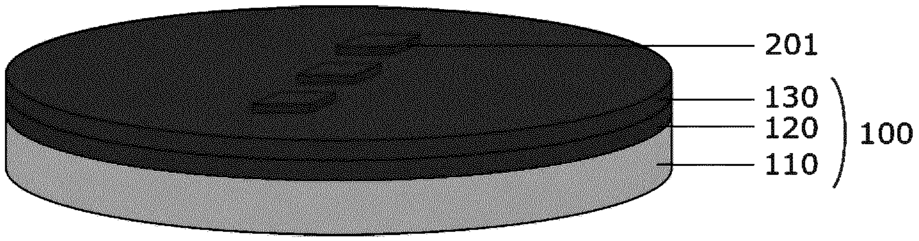
FIGS. 8 and 9 are perspective views, diagrammatically illustrating the first substrate T 100 according to a second embodiment of the present invention further comprising electronic elements (201, 202).

FIG. 8 illustrates the three-layer first substrate T 100 of FIG. 7 further comprising three electronic elements (201, 202). Said electronic elements may be applied to the substrate following conventional microelectronics manufacturing processes such as deposition, lithography, etching, coating, etc. Any type of electronic elements that can be carried out using conventional microelectronics manufacturing processes (sensors, transistor, diodes, etc.) may be thus formed on the surface of the second substrate P, as long as they are compatible with the latter.

Figure 9:
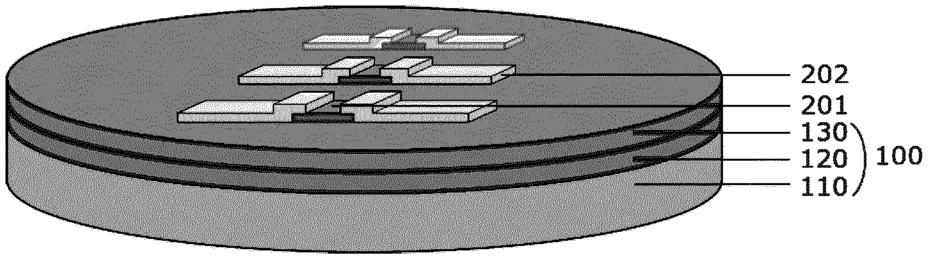

FIG. 9 illustrates further electrodes representing the second thin layer 202. Thus, the stack of electronic elements 201 and 202 represents an assembly of electronic elements constituting the electronic function 200 shown in FIG. 10.

Figure 10:
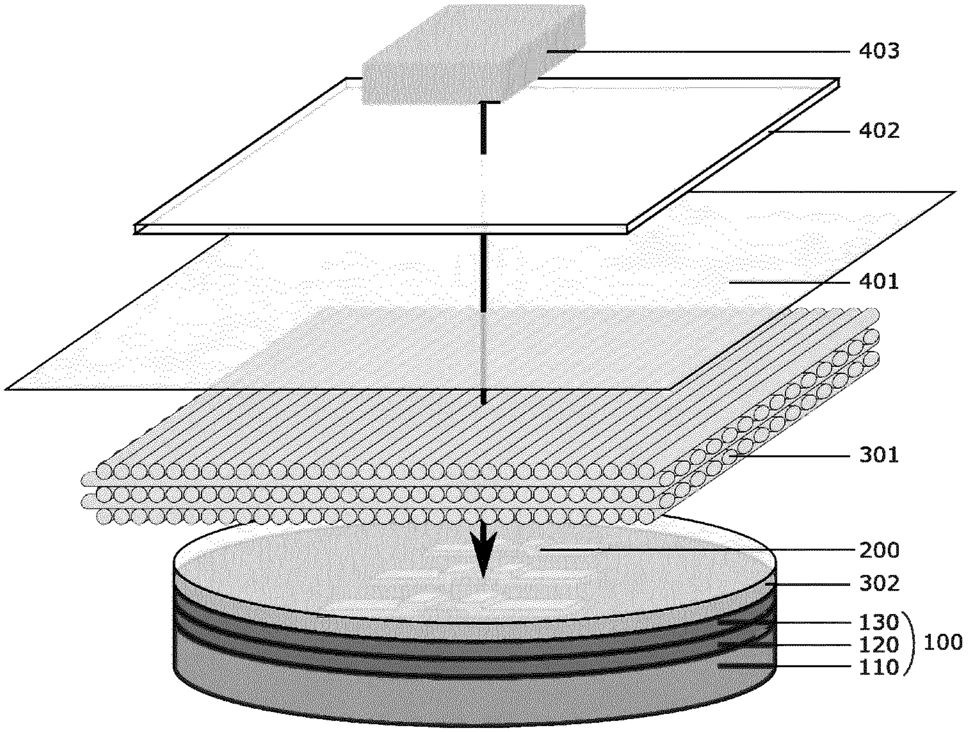
FIG. 10 is an exploded view, diagrammatically illustrating the first substrate T 100 and electronic elements 200 according to a second embodiment of the present invention according to FIG. 9 coated with a resin 302 and further illustrating the second substrate P 301 and a series of elements (401, 402, 403) suitable to confer the definitive form of the composite material.

FIG. 10 illustrates an intermediate step of the process of manufacturing the composite material wherein the first substrate T 100 and its function 200 is coated with an epoxy resin 302. As was the case in the first embodiment, once the coating has been performed, the second substrate P 301 in the form of a layer of fiberglass is deposited onto the coated entity. To allow good impregnation of the resin 302 in the fiberglass 301 and obtain an impregnated second substrate P 301 with a constant thickness upon each process, a silicone tarpaulin 401 (or any type of low-adhesion film) with a glass plate 401 and a weight 403 are superimposed on the surface of the fiberglass. Alternatively, the second substrate P is deposited onto the first substrate T 100 and its function 200 prior to the coating step.

Once the resin has hardened, the weight 403, the glass plate 402 and the silicone cover 401 used for the impregnation are manually removed. The resulting product is illustrated in FIG. 11*a*.

The electronic element is integrated in the hardened resin, at the interface of the first substrate T 100, and in particular with third inner layer 130.

Figure 11A:
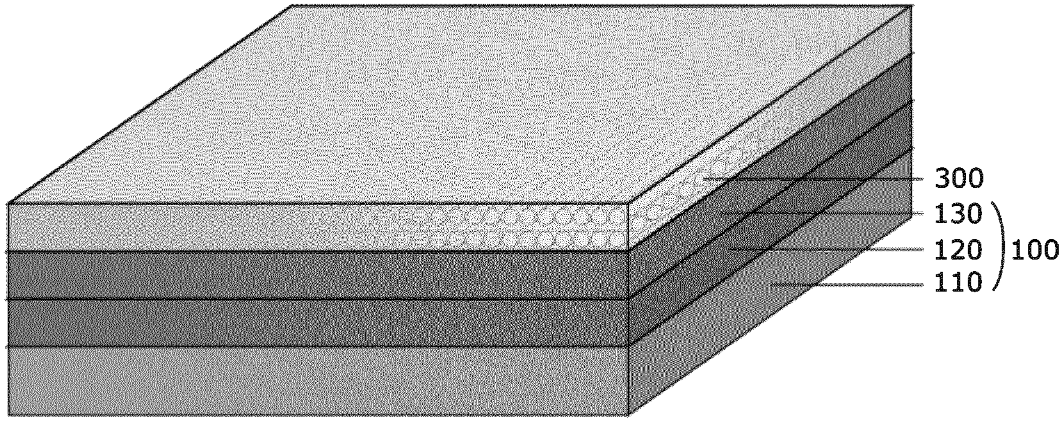
FIGS. 11*a* and 11*b* are perspective views, diagrammatically illustrating the impregnated second substrate P 300 associated to the first substrate T (100 formed by 110, 120, 130) before removal of layers 110 and 120 (11*a*) and after removing them (11*b*).
Figure 11B:
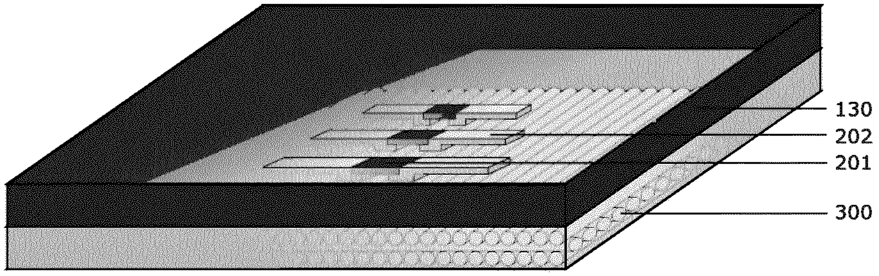

FIG. 11*a* illustrates the intermediate product obtained after partial removal of first substrate T. Indeed, according to this embodiment, the various layers of said substate T 100 are removed consecutively. The first substrate first outer layer 110, a second middle layer 120 can be removed very easily manually leading to the intermediate product illustrated in FIG. 11*b* wherein the third inner layer 130 is still present. Indeed, the adhesion between the composite material formed and the third inner layer 130 is greater than the adhesion between the third inner layer 130 and the non-adhesive second middle layer 120. The third inner layer 130 may be removed by a different technique, such as etching.

Figure 12:
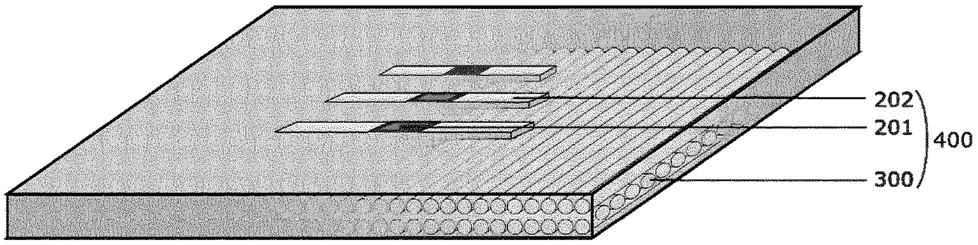
FIG. 12 is a perspective view, diagrammatically illustrating the composite material obtained according to the second embodiment of the present invention.

A functionalized ply is thus obtained, as illustrated in FIG. 12. Its representation is similar to the one in FIG. 6. The functionalized ply 400 comprises the electronic elements 201 and 202 integrated in substrate 300.

Figure 13:
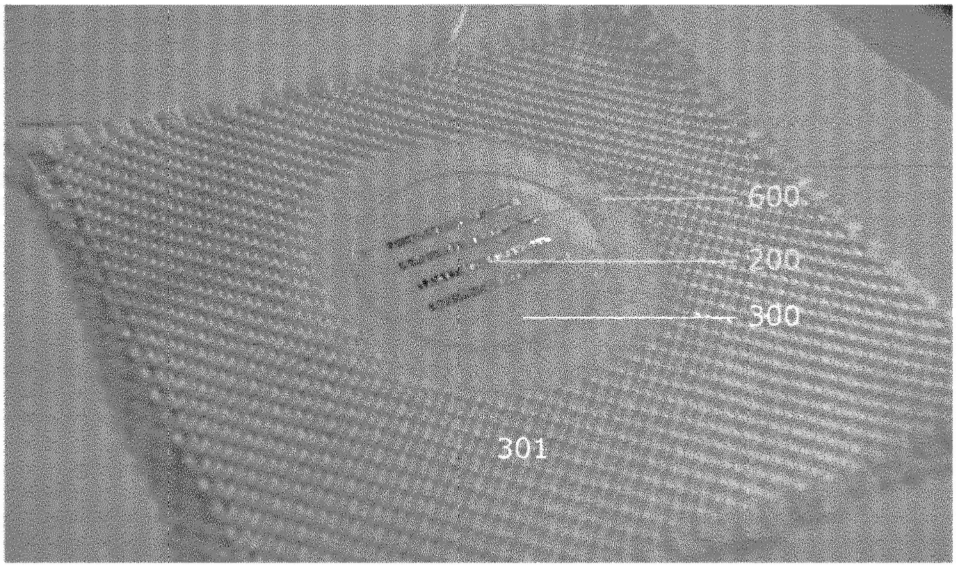
FIG. 13 is a photo of a ply obtained according to the process of the present invention.
Figure 14A:
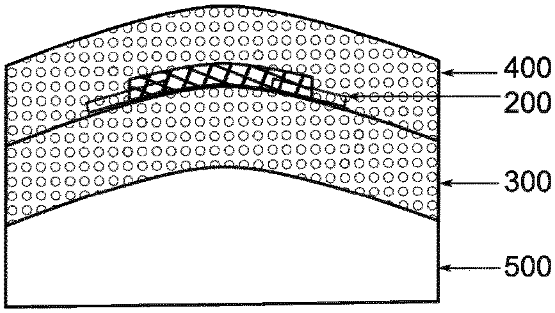
FIGS. 14*a-d* are cross-section views diagrammatically illustrating composite materials comprising a plurality of plies positioned on a mould 500 presenting a convex side, said materials comprising one ply 400 integrating electronic elements 200 at its surface and one ply 300 exempt from electronic elements (a) or two plies 400 integrating electronic elements 200 at the surface of each ply and two, respectively three plies 300 exempt from electronic elements (b, c); or a composite material of (c) after unmoulding(d).
Figure 14B:
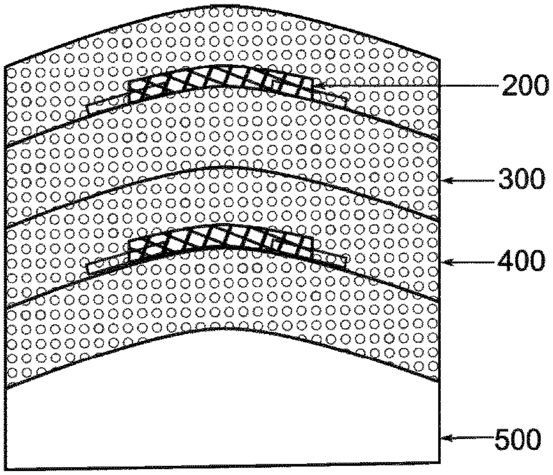
Figure 14C:
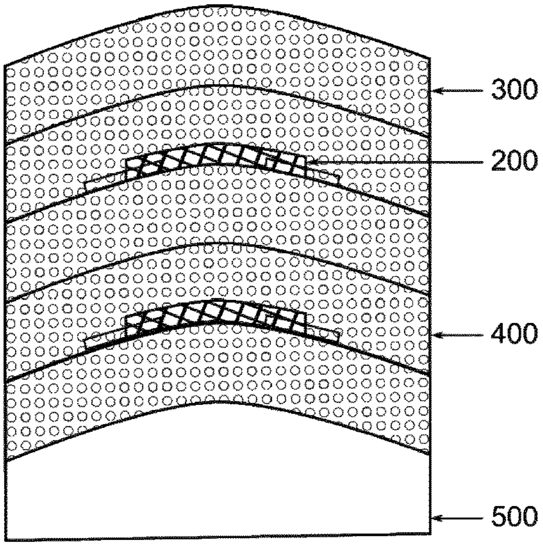
Figure 14D:
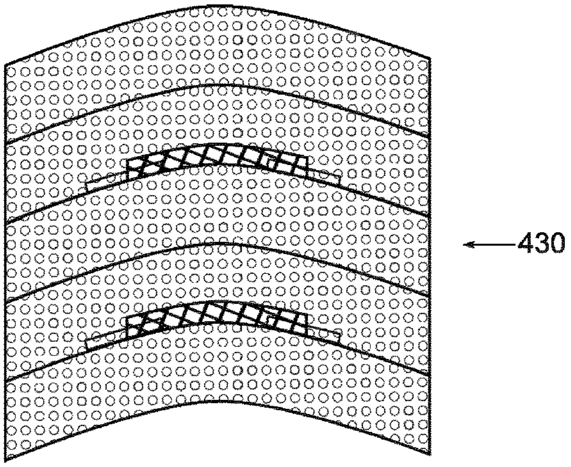

FIG. 13 shows a composite material comprising a single ply integrating four electronic elements 200 at its surface obtained according to the process of the invention. It further comprises electrical connection means 600 extending from said electronic elements 200. FIGS. 14*a-d* illustrate various intermediate steps leading to a 3D composite material comprising a plurality of plies wherein two plies 400 integrate electronic elements 200 at their surfaces. As shown in these figures, said integrated electronic elements are similar. Thus, after unmoulding, the electronic elements 200 are positioned in the heart of the end-composite material. Alternatively, according to a non-illustrated embodiment, a ply integrating at least an electronic element at its surface may be directly positioned onto the mould. Thus, after unmoulding, the electronic element is at the surface of the end-composite material. Alternatively, according to a non-illustrated embodiment, when at least two plies each integrate electronic elements at their surfaces, said integrated electronic elements may be different from each other.

Using such mould 500 is advantageous since it allows forming 3D composite materials without limiting the number of plies added, nor their composition. The skilled person will adapt the shape of the mould according to his/her needs. In FIGS. 14*a-d*, the mould 500 has a convex side for illustrative purposes only.

Figure 15A:
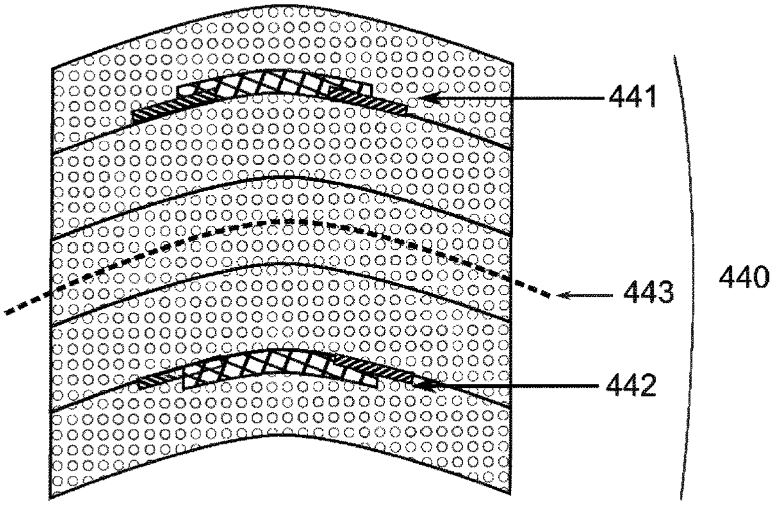
FIG. 15 *a,b* are cross-section views, diagrammatically illustrating a composite material (440, 450) obtained according to the present invention integrating a strain gauge and associated electrodes.
Figure 15B:
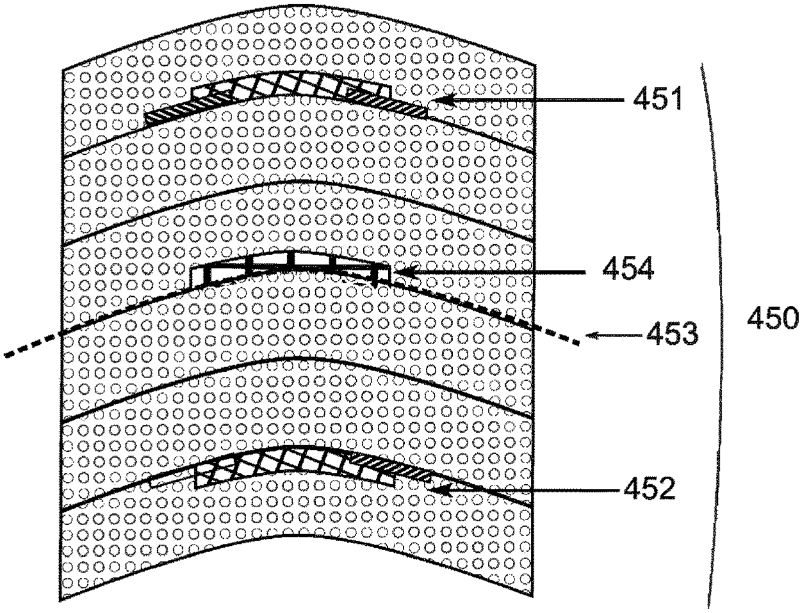
Figure 16A:
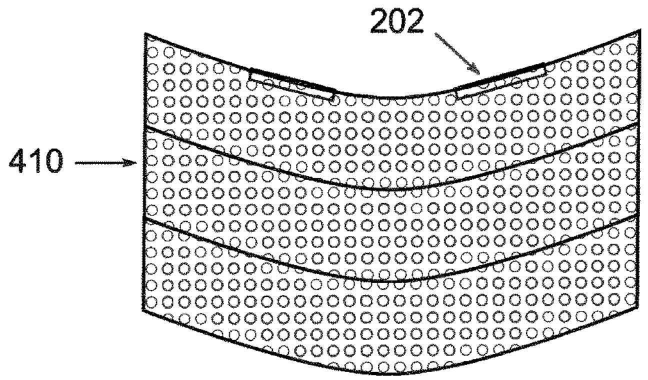
FIG. 16 *a,b* are cross-section views, diagrammatically illustrating a composite material (410, 420) obtained according to the present invention integrating a 3D Printed Circuit Board.
Figure 16B:
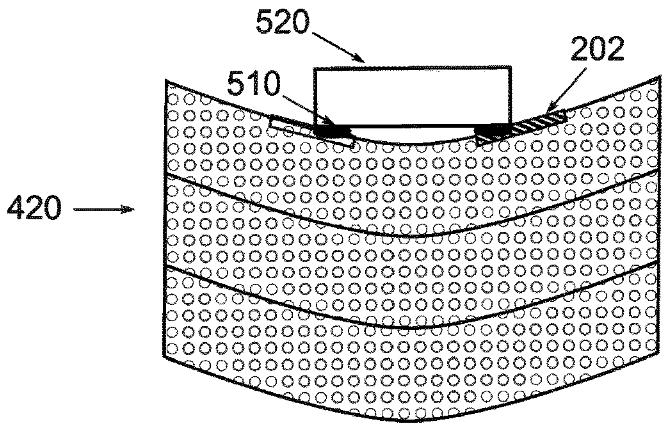

FIGS. 15 and 16 are illustrative examples of examples 3 and 5 below.

Figure 17:
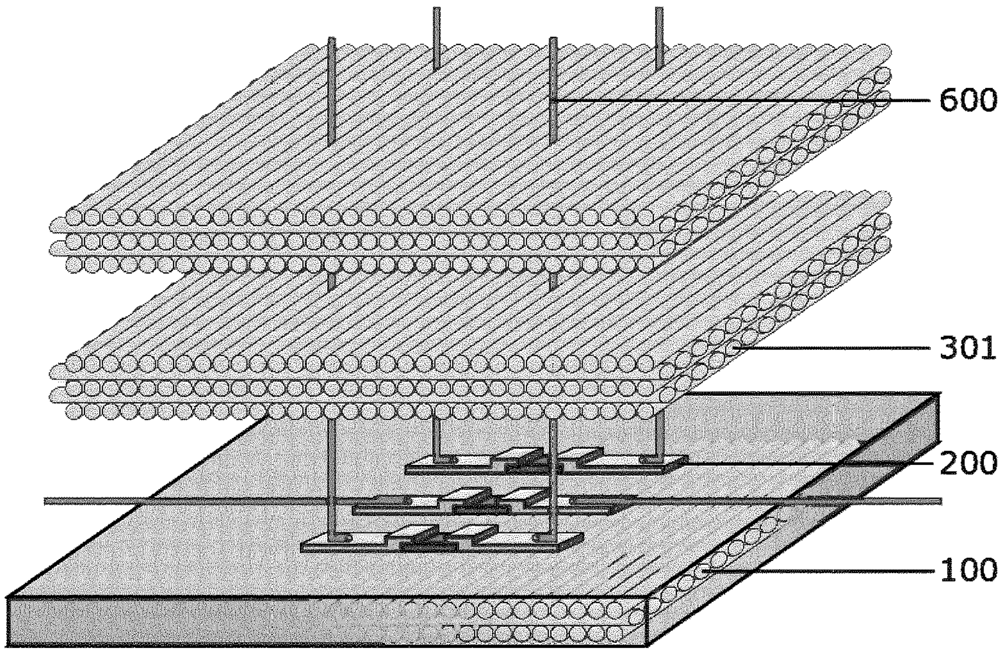
FIG. 17 is an exploded view of a multi-ply intermediate product according to the invention wherein the electrical connections 600 are configured to traverse the thickness of each ply 301 constituting the composite material.

FIG. 17 illustrates a multi-ply composite material according to the invention wherein the electrical connection means 600 fixed are configured to traverse the thickness of each ply constituting the composite material. If the size of the composite parts allows it, the connections can be screen-printed to the edge of said part and the electrical connection means 600 can be made by its edge directly to the electronic elements 200.

Example 1. Process of Manufacturing of a Single-Layer Composite Material Comprising a Ply Integrating an Electronic Routing Example 1 is an illustrative example of the first embodiment as illustrated in FIGS. 1-6. A PVA sheet is provided.

The sheet is commercially available and sold under the name Hydrograhpics PXA4 by Design Plus. The electronic element 200 is an electronic routing wherein silver ink is deposited by screen printing. A mix of epoxy resin and hardener are prepared. The resin is commercially available and sold under the commercial name of SR InfuGreen 810 by Sicomin Epoxy Systems The hardener is commercially available and sold under the commercial name of SD 8824. They are mixed in a mass ratio of 23:77. The mixture is degassed in a vacuum chamber for 1 hour 30 minutes and subsequently used for coating the PVA sheet comprising the electronic routing. A fiberglass ply is placed on top. To allow good impregnation of the resin in the fiberglass and obtain an identical thickness for each process, a silicone tarpaulin is superimposed on the surface of the fiberglass with a glass plate and a weight. After the resin hardened, the silicone tarpaulin, the glass plate and the weight are manually removed. The first substrate is removed by tearing off or by dissolving it in water. A single-layer composite material comprising a ply integrating an electronic routing is thus obtained.

Example 2. Process of Manufacturing of a Single-Layer Composite Material Comprising a Ply Integrating a Silicon-Based Piezoresistive Strain Gauge Example 2 is an illustrative example of the second embodiment as illustrated in FIGS. 7-12. A three-layered first substrate T is produced. It comprises a first silicon wafer forming a first outer layer. A second middle layer 120 is produced by carrying out a coating (Sussmicrotec RC8 spin coater) by centrifugation of PMMA (495 PMMA A11 MICRO CHEM) diluted to 50% with anisole on said silicon wafer. The coating conditions are: 30 seconds, 4000 rotation per minute speed, with an acceleration of 5000 rotations per minute per second. An annealing step is subsequently performed at 100° ° C. for 3 minutes on a hot plate to allow polymerization and evaporation of solvents. A second middle layer of PMMA having a thickness of less than 1 μm is thus obtained.

A third inner layer is further produced by carrying out a coating (Sussmicrotec RC8 spin coater) by centrifugation of a polyimide (FUJIFILM, Durimide 7320) diluted to 25% with anisole. The coating is performed in two separate wub-steps. The coating conditions in the first sub-step are: 30 seconds, 300 rotation per minute speed, with an acceleration of 100 rotations per minute per second. The coating conditions in the second sub-step are: 30 seconds, 4000 rotation per minute speed, with an acceleration of 500 rotations per minute per second. An annealing step is subsequently performed at 100° C. for 3 minutes on a hot plate to allow polymerization and evaporation of solvents. A third inner layer of durimide having a thickness of less than 1 μm is thus obtained.

The electronic elements are obtained via photolithography. Firstly, a deposition of N-doped microcrystalline silicon by PECVD is performed (PECVD for Plasma-Enhanced Chemical Vapor Deposition. The deposition conditions are as follow: $SiH_4$=1.5 sccm (sccm for Standard Cubic Centimeters Per Minute), Ar=75 sccm, $H_2$=75 sccm, $AsH_3$=10 sccm, RF power=15 W, Temperature=165° ° C., Pression=0.9 mbar, duration of ignited plasma=24 min. A N-doped microcrystalline silicon layer having a thickness of 90 nm is thus obtained.

Photolithography of the silicon layer is then performed. The etching conditions with $SF_6$ plasma are as follow: gas flow=50 sccm, Pression=30 mTorr, RF power=50 W, time=1 min. The three electronic elements are thus obtained.

Aluminium deposit by evaporation of ingot in a crucible is carried out. An aluminium layer having a thickness of 150 nm is thus obtained. Photolithography of the aluminium layer is then performed followed by etching by orthophosphoric acid bath.

Aluminium electrodes are obtained representing, together with the three electronic elements the strain gauge.

A mix of epoxy resin and hardener are prepared. The resin is commercially available and sold under the commercial name of SR InfuGreen 810 by Sicomin Epoxy Systems The hardener is commercially available and sold under the commercial name of SD 8824. They are mixed in a mass ratio of 23:77. The mixture is degassed in a vacuum chamber for 1 hour 30 minutes and subsequently used for coating by centrifugation the electronic elements including the aluminium electrodes. The coating conditions are: 60 seconds, 300 rotation per minute speed, with an acceleration of 100 rotations per minute per second.

A woven fiberglass ply is placed on top. To allow good impregnation of the resin in the fiberglass and obtain an identical thickness for each process, a silicone tarpaulin is superimposed on the surface of the fiberglass with a glass plate and a weight. After the resin hardened, the silicone tarpaulin, the glass plate and the weight are manually removed.

The first three-layered substrate T should be now removed. The first substrate first outer layer 110, a second middle layer 120 are removed very easily manually since the adhesion between the composite material formed and the third inner layer is greater than the adhesion between the third inner layer and the non-adhesive second middle layer.

The third inner layer is removed by etching with oxygen plasma. The etching conditions are as follow: oxygen flow=20 sccm, pression=10 mTorr, power=200 W, time=5 min. A single-layer composite material comprising a ply integrating a silicon-based piezoresistive strain gauge is thus obtained.

Example 3. Process of Manufacturing of a Multi-Layer Composite Material Comprising Two Plies Integrating Each a Silicon-Based Piezoresistive Strain Gauge An illustrative example of such composite material 440 is given in FIG. 15*a*. A ply integrating a silicon-based piezoresistive strain gauge is obtained according to Example 2.

Such configuration allows having electronic elements (or other detection sensors) that undergo both tensile (441) and compression (442) forces. Their position is chosen according to the symmetry plane 443 of the end composite material. The combination of elements undergoing each either of the two cited forces within a Wheatstone bridge provide an optimized electrical signal.

Example 4. Process of Manufacturing of a Multi-Layer Composite Material Comprising Three Plies Wherein Two of them Integrating Each a Silicon-Based Piezoresistive Strain Gauge A ply integrating a silicon-based piezoresistive strain gauge is obtained according to Example 2. A ply integrating a function different from a silicon-based piezoresistive strain gauge may be obtained either according to Examples 1 or 2.

Alternatively, to the configuration given in FIG. 15*a*, the configuration given in FIG. 15*b* may be used when a different electronic element 454 from said strain gauge is integrated at a surface of a ply (such as a packaging electronics, a radiating element, an antenna, a sensor) and should not withstand mechanical deformation. It is thus placed in the neutral plane 453. Said electronic element 454 may be further electrically connected to strain gauges configure to undergo tensile (451) or compression (452) forces.

Example 5 Process of Manufacturing of a Multi-Layer Composite Material in the Form of a Printed Circuit Board 3D (PCB_3D)

An illustrative example of such composite material is given in FIG. 16. The configuration according to FIG. 16*a* describes a configuration wherein the mutually isolated electronic elements 202 are directly accessible at the surface of the 3D composite material 410. Accordingly, a further component 520 may be connected to the electronic elements 202 via conductive soldering 510, thus obtaining composite material 420.

The invention claimed is:

1. A method of manufacturing a composite material comprising at least one ply integrating at least one electronic element situated at the surface of said at least one ply, the method comprising the following steps:

a) preparing or providing a first substrate T comprising at least one layer;

b) applying at least one electronic element onto a face of the said first substrate;

c) preparing or providing an impregnable second substrate P, said second substrate being placed on top of the at least one electronic element so that the at least one electronic element is interposed between the first substrate and the second substrate;

d) at least partially impregnating the so-obtained product of step c) within an impregnation material to form a matrix incorporating the at least one electronic element and the second substrate P;

e) removing the first substrate from the impregnated product obtained in step d); and f) recovering the composite material, wherein the ratio between the thickness of said at least one ply and the thickness of the electronic element is at least 300, and wherein the thickness of said at least one ply is between 200 micrometers and 500 micrometers.

2. The method according to claim 1, wherein the thickness of the second substrate is superior to the thickness of the electronic element.

3. The method according to claim 1, wherein the first substrate is removed by dissolving, stripping, peeling or etching or a combination thereof.

4. The method according to claim 1, wherein the second substrate is a porous material.

5. The method according to claim 1, wherein the impregnation material is a curable resin.

6. The method according to claim 1, wherein the composite material comprises at least two electronic elements integrated within the at least one ply, said elements either being placed onto the same face of the first substrate mutually spaced from one another or being placed one on top of the other starting from the same face of the first substrate in a sandwich-like manner.

7. The method according to claim 1, wherein the composite material recovered in step f) is placed on a mould so that the shape of the said composite material conforms to the shape of the mould.

8. The method according to claim 1, wherein the first substrate is placed on a mould prior to step b) so that the shape of the said first substrate conforms to the shape of the mould.

9. The method according to claim 1, wherein electrical connection means are fixed to the at least one electronic element and extend outwardly therefrom according to a direction parallel to the plane of the said at least one ply.

10. The method according to claim 1, wherein electrical connections means are fixed to the at least one electronic element and are configured to traverse each of the at least one ply and second substrate constituting the composite material according to a direction approximately perpendicular to the plane of each of the at least one ply.

* * * * *